United States Patent [19]

Lell et al.

[11] 4,249,921
[45] Feb. 10, 1981

[54] SULPHUR CONDENSING APPARATUS

[75] Inventors: Rainer Lell, Kerpen; Werner Lemberg, Cologne, both of Fed. Rep. of Germany

[73] Assignee: Davy International Aktiengesellschaft, Fed. Rep. of Germany

[21] Appl. No.: 971,304

[22] Filed: Dec. 20, 1978

[30] Foreign Application Priority Data

Dec. 21, 1977 [DE]  Fed. Rep. of Germany ....... 2756992

[51] Int. Cl.$^3$ ............................................. B01D 50/00
[52] U.S. Cl. ........................................ 55/269; 55/466; 55/486; 55/DIG. 25; 23/294 S; 165/111
[58] Field of Search ............ 55/73, 268, 269, 444–446, 55/466, 481, 482, 485, 486, 525, DIG. 25; 165/112, 113, 111; 23/294 S

[56] References Cited

U.S. PATENT DOCUMENTS

| 447,327 | 3/1891 | Hussey et al. | 55/485 |
| 522,416 | 7/1894 | Iles | 165/113 |
| 600,921 | 3/1898 | Lloyd et al. | 55/444 |
| 752,999 | 2/1904 | Osbourn | 55/268 |
| 835,243 | 11/1906 | Jeffereys | 55/485 |
| 1,727,403 | 9/1929 | Gibbs | 165/111 |
| 1,972,884 | 9/1934 | Gleason | 55/73 |
| 2,331,524 | 10/1943 | Wade | 23/294 S |
| 2,354,722 | 8/1944 | Walton et al. | 55/486 |

Primary Examiner—Bernard Nozick
Attorney, Agent, or Firm—Bernard & Brown

[57] ABSTRACT

An apparatus is provided for the condensation of sulphur vapor and for the separation of sulphur droplets from a gas flow, preferably from the reaction gas flow from a Claus catalyst. Such apparatus comprises a vessel, a nest of tubes arranged in the vessel between tube plates, pipe connections at the vessel for the supply and discharge of a coolant flowing around the nest of tubes and an inlet pipe connection and an outlet pipe connection for the gas flow at the vessel, upstream and downstream of the said nest of tubes, respectively. Positioned in the vessel is a sulphur separation unit through which the sulphur-containing gas flows and on the surfaces of which sulphur vapor condenses and/or liquid sulphur collects and agglomerates. Sulphur discharge openings are provided in the bottom of the vessel on both the upstream and downstream sides of the separation unit.

5 Claims, 2 Drawing Figures

SULPHUR CONDENSING APPARATUS

This invention relates to apparatus for processing sulphur-containing reaction gases produced, for example, by the Claus reaction. With the Claus reaction according to the reaction equation

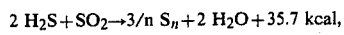

$$2\ H_2S + SO_2 \rightarrow 3/n\ S_n + 2\ H_2O + 35.7\ kcal,$$

a reaction gas containing sulphur vapour and having a temperature of for example 220° to 320° C., is formed which has to be cooled in order to separate the formed sulphur. Previously, the cooling of the reaction gas flow to the condensation temperature of the vaporous sulphur, i.e. to about 130° to 160° C., is carried out in an indirectly cooled sulphur condenser. In this condenser, a part of the condensed sulphur is already obtained in liquid form. Another part leaves the sulphur condenser in the form of fine droplets with the gas flow, so that a separate separator is provided downstream of the condenser, in which separator the sulphur droplets are separated from the reaction gas flow. Since the sulphur, with the cooling of the reaction gas flow to below the sulphur dew point, needs a certain time for the formation and the growth of the sulphur droplets, the arrangement of the separator, separated from the condenser, caused a lengthened time period between the cooling and separation and hence the possibility of forming sulphur droplets large enough for the separation. Since liquid sulphur is obtained in both the sulphur condenser and in the sulphur droplet separator, separate pipe conduits were necessary, which conducted the liquid sulphur to the sulphur collecting vat and were immersed therein in the manner of a siphon.

The object of the invention is to reduce the cost of the equipment necessary for the separation of elemental sulphur from a sulphur-containing gas flow, more particularly from the reaction gas of a catalytic Claus stage, without any deleterious effect on the degree of sulphur separation.

According to the invention, this object is achieved with the apparatus as initially referred to by the fact that a separation unit, through which sulphur-containing gas flows, is arranged in said vessel between the tube plate of the nest of tubes at the gas outlet side and said gas outlet pipe connection, and discharge openings are arranged at the vessel base upstream and downstream of said separation unit for the sulphur which is separated before, in and behind the separation unit. It was found that, despite the compulsorily short path of gas between condenser and the separation unit, there is obtained over all a condensation corresponding to the gas temperature, and a separation of the sulphur. By using the apparatus according to the invention, the expenses involved for a separate separator, which is more especially due to the separator housing, frame, foundations, the insulation of the separator and the assembly, is either reduced or completely avoided. The sulphur is drawn off through the discharge opening at the upstream side, and this sulphur, because of the cooling to below its dew point, is spontaneously formed in liquid form. The sulphur deposited in the separation unit runs off through the discharge opening at the downstream side.

The separation unit preferably only occupies a part of the vessel cross-section perpendicular to the gas flow direction and the remaining part of the vessel cross-section is closed off by a gas-tight partition. The separation unit preferably has a square, e.g. quadratic, inflow cross-section, whereas the vessel or shell has generally a round and preferably a circular cross-section. The gas-tight partition closes off the path of gas between the separation unit and the housing shell, so that the gas, charged with fine sulphur droplets, has to take the path through the separation unit.

In accordance with the preferred embodiment of the apparatus according to the invention, provision is made for the two discharge openings to open into a pipe connection which is divided by an extension of the partition and is closed at the bottom, the said pipe connection comprising a sulphur overflow opening downstream of the partition, the partition extension terminates at a distance above the base of the pipe connection, and the sulphur overflow opening is arranged at such a height above the bottom edge of the partition extension that the hydrostatic pressure of the liquid sulphur corresponding to this height is at least equal to the maximum gas pressure drop at the separation unit. By this means, the apparatus is simplified and made less costly, because the liquid sulphur phase obtained before and after the separation unit discharges through the same pipe connection and is drained through the same overflow opening. The apparatus according to the invention thus only requires one heated sulphur pipe leading to the sulphur collecting vat, as compared with two pipes with a separate condenser and separator. Because the sulphur overflow opening is arranged at such a height above the bottom edge of the partition extension that the hydrostatic pressure of the liquid sulphur corresponding to this height is at least equal to the maximum gas pressure drop at the separator unit, it is ensured that the gas spaces in the pipe connection on both sides of the partition extension are permanently separated by a column of liquid sulphur. The reaction gas charged with sulphur droplets is thus unable to pass through the pipe connection as a by-pass to the outlet pipe connection, but has to pass through the separation unit. Since the pressure drop at the separation unit is variable, for example depends on the gas flow velocity and the sulphur loading of the unit, the maximum gas pressure drop which is at all possible is decisive for the height of the sulphur overflow opening above the bottom edge of the partition extension. Since not only the sulphur collecting pipe connection, but also the pipe leading to the sulphur collecting vat have to be provided with a heating jacket for heating purposes, an inexpensive solution is provided by combining the liquid sulphur obtained at the upstream and downstream sides of the separation unit in one pipe connection and in one pipe.

Furthermore, it is preferably provided that an opening pipe connection corresponding to the dimensions of the separation unit is formed on the upper side of the vessel above the said separation unit, and the latter and possibly at least a part of the partition are suspended from a cover closing the opening pipe connection. Because of this construction, the separation unit and possibly parts of the partition or the partition extension extending into the pipe connection can be withdrawn from the vessel and maintained or replaced. The partition with the separation unit is expediently arranged substantially perpendicularly of the tubes of the nest of tubes.

The sulphur separation unit comprises any arrangement of surfaces around and through which surfaces sulphur vapour-containing gas can flow and on which surfaces sulphur droplets can condense, collect and/or agglomerate. The separation unit preferably consists on its upstream side of a layer of wire mesh and on its downstream side of a layer of laminated sheet metal plates. The layer consisting of wire mesh serves for the agglomeration of fine sulphur droplets into larger droplets capable of being separated; the layer of laminated sheet metal plates provides for the separation of the sulphur droplets from the gas flowing therethrough.

Since the gas in a Claus plant generally flows through several catalytic stages, several condenser-separators according to the invention are necessary. According to the invention the sulphur overflow opening of the pipe connection and sulphur overflow openings of other condenser-separators corresponding to said several catalytic stages may be connected to a common sulphur collecting pipe, as shown in FIG. 2, which is connected in the manner of a siphon to a sulphur collecting vat. It thus becomes unnecessary to lead an individual, heated sulphur pipe from each condenser-separator to the sulphur collecting vat. One collecting or header pipe is sufficient, to which the overflow openings of all condenser-separators are connected.

Figure 1:
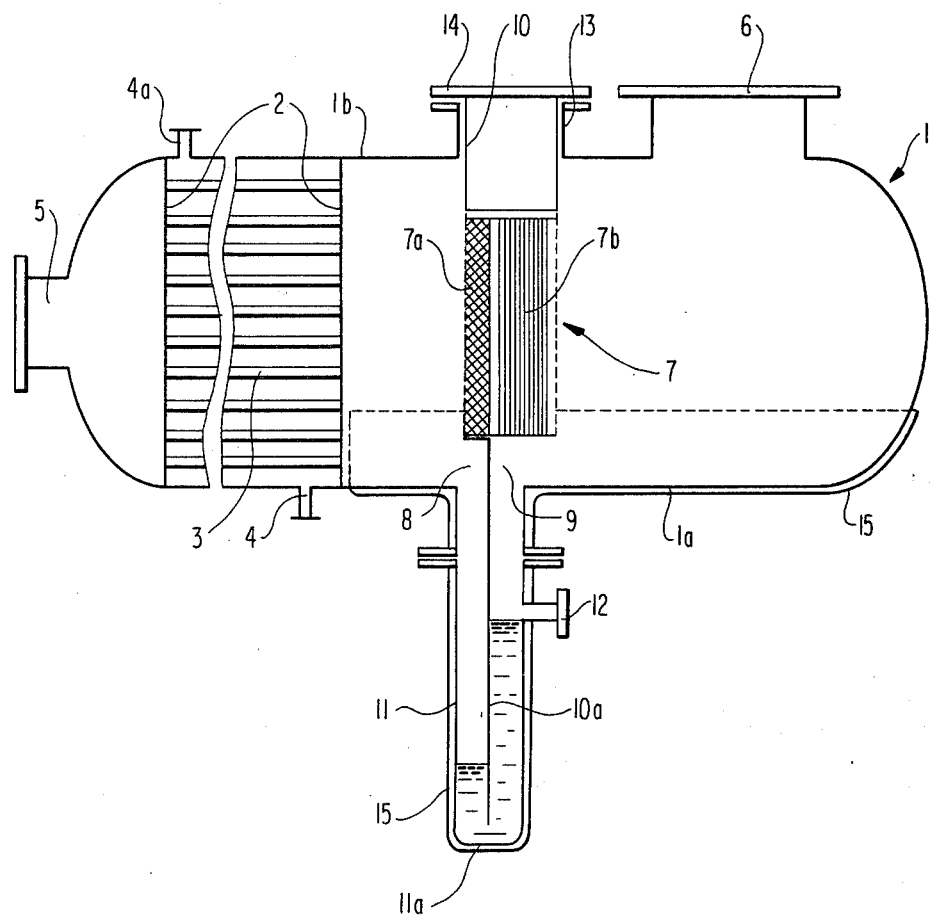
FIG. 1 shows diagrammatically a cross-section of one embodiment of the apparatus according to the invention.
Figure 2:
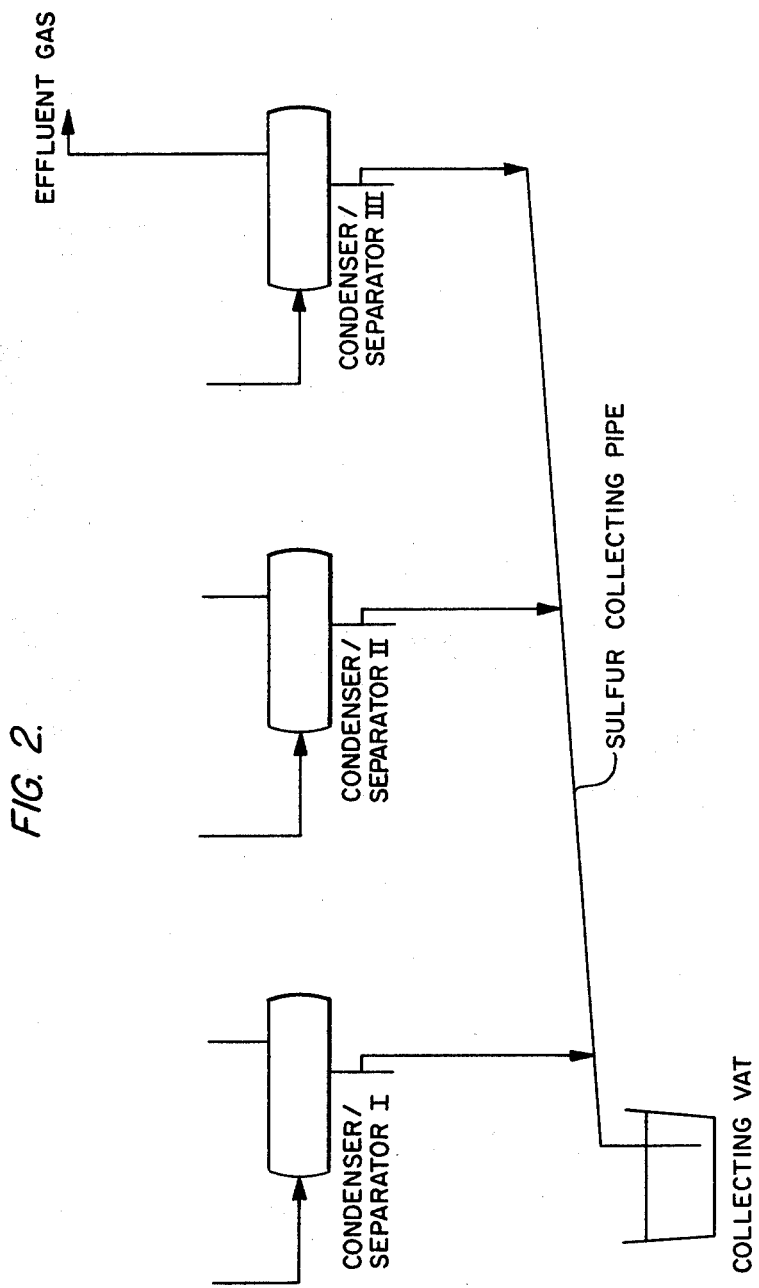
FIG. 2 shows a schematic of several condenser-separators of the invention arranged in series and connected to a common sulphur collecting pipe.

According to FIG. 1, a vessel 1 has arranged therein an inlet pipe connection 5 for the sulphur-containing gas and an outlet pipe connection 6 for the gas which is freed from elemental sulphur. In the forward section of the vessel 1 is provided a nested tube heat exchanger 3, to which a coolant, for example, boiler feed water, is fed through the pipe connection 4. The steam which is generated escapes through the pipe connection 4a. It is obviously also possible to use as coolant cold reaction gas, or boiler feed water for heating purposes. A pipe connection 13, which is covered by a cover 14, is arranged downstream of the nest of tubes 3 at the top 1b of the vessel 1. A separation unit 7, which consists of a wire mesh layer 7a at the upstream side and a layer of laminated sheet metal plates 7b at the downstream side is suspended from the cover 14.

The separation unit 7 is enclosed by a wall 10, which shuts off the passage of gas between the housing shell 1 and the separation unit.

A pipe connection 11 is flanged at the vessel bottom 1a below the unit 7. The partition 10 is extended into this pipe connection, so that discharge openings 8 and 9 for the liquid sulphur exist on both sides of the partition 10. The partition extension 10a terminates slightly above the bottom 11a of the pipe connection 11. A sulphur overflow opening 12 is arranged on pipe connection 11 at the downstream side of the partition extension 10a, i.e. on the side which is connected to the downstream side of the unit 7. The sulphur which has accumulated in the housing 1 is able to discharge through opening 12. During operation, a pressure drop is established at the separation unit 7, and this pressure drop determines the difference in level of the sulphur on both sides of the partition extension 10a. The opening 12 is situated at such a height above the bottom edge of the partition extension 10a that the sulphur level at the upstream side of the partition extension 10a, even with the maximum possible pressure drop at the unit 7, is not forced below the bottom edge of the partition extension 10a. In this way, the reaction gas is prevented from flowing to the discharge pipe connection 6 by by-passing the unit 7. The bottom 1a of the housing and also the pipe connection 11 are provided with a jacket 15, which can be heated with steam for keeping the separated sulphur in liquid form. The sulphur pipe leading away from the overflow opening 12 must also be capable of being heated.

In operation, the reaction gas from a Claus catalyst stage entering through the pipe connection 5, at for example 300° C., is cooled in the nest of tubes 3 down to, for example, 160° C., as a result of which the temperature falls below the sulphur dew point and some of the elemental sulphur is liquefied. This liquid sulphur is already separated from the gas flow before the gas flow enters the separation unit 7, at the bottom of the housing and flows through the discharge opening 8 into the pipe connection 11. Then the gas flow passes through the separation unit 7, in which more sulphur is agglomerated and separated. This sulphur is accumulated on the base 1a of the vessel on the downstream side of the unit 7 and flows through the discharge opening 9 into the pipe connection 11. The reaction gas leaves the condenser-separator through the connection 6. A level difference of the liquid sulphur on both sides of the partition extension 10a corresponding to the pressure drop at the unit 7 is established in the pipe connection 11. The liquid sulphur flowing into connection 11 is drawn off through the overflow opening 12.

What is claimed is:

1. Apparatus for condensing sulphur vapour and separating sulphur droplets from a sulphur-containing reaction gas from a Claus reactor, which apparatus comprises an elongated vessel; a nest of tubes which extend in the longitudinal direction of the vessel and are arranged in said vessel between two tube plates, through which tubes flows said sulphur-containing gas; pipe connection at the vessel housing for the supply and discharge of a coolant which flows around said nest of tubes; a gas flow inlet pipe connection and a gas flow outlet pipe connection at the vessel housing upstream and downstream of said nest of tubes, respectively; a separation unit, through said gas is forced, adapted to separate sulphur droplets from said gas and arranged in said vessel between the tube plates at the downstream ends of the tubes and said gas flow outlet pipe connection; the separation unit occupies a part of the vessel cross section perpendicular to the direction of the gas flow and the remaining part of the vessel cross section is closed off to gas flow by a gas-tight partition; a first discharge opening arranged at the bottom of said vessel upstream of said separation unit for discharging sulphur separated from said gas before said unit, and a second discharge opening at the bottom of said vessel downstream of said separation unit for discharging sulfur separated from said gas in and behind the separation unit; and the upstream and downstream discharge openings both open into a pipe connection which is divided by an extension of said partition and which is closed at the bottom, said closed pipe connection having a sulphur overflow opening downstream of said partition, the partition extension ending in spaced relationship above the bottom of said closed pipe connection, said sulphur overflow opening being arranged at such a height above the bottom edge of said partition extension that the hydrostatic pressure of the liquid sulphur which collects in said closed pipe connection, corresponding to said height, is at least equal to the maximum gas pressure drop across the separation unit.

2. Apparatus according to claim 1 wherein a pipe connection opening corresponding to the size of the separation unit is formed on the upper side of said vessel above the separation unit, said separation unit and at least a part of said partition being suspended from a cover which closes off said pipe connection opening.

3. Apparatus according to claim 2 wherein the partition and the separation unit are arranged substantially perpendicularly to the tubes comprising said nest of tubes.

4. Apparatus according to claim 1, 2 or 3 wherein the separation unit comprises, on the upstream side, a wire mesh and, on the downstream side, a layer of laminated sheet means for separating sulphur droplets from gas flowing therethrough.

5. Apparatus according to claim 1, 2, or 3 wherein the sulphur overflow opening of the closed pipe connection and the sulphur overflow openings of additional similar apparatus are connected to a common sulphur collecting pipe, which pipe is connected to a sulphur collecting vat.

* * * * *